United States Patent Office 3,651,052
Patented Mar. 21, 1972

3,651,052
PIPERIDINE SPIRO COMPOUNDS
Michio Nakanishi, Oita, Katsuo Arimura and Tatsumi Tsumagari, Fukuoka, and Masami Shiroki, Oita, Japan, assignors to Yoshitomi Pharmaceutical Industries, Ltd., Higashi-ku, Osaka, Japan
No Drawing. Application July 3, 1969, Ser. No. 839,046, now Patent No. 3,574,204, which is a continuation-in-part of application Ser. No. 675,074, Oct. 13, 1967. Divided and this application May 18, 1970, Ser. No. 48,739
Int. Cl. C07d 93/06, 29/120
U.S. Cl. 260—243 R                              8 Claims

ABSTRACT OF THE DISCLOSURE

The piperidine spiro compounds of the formula:

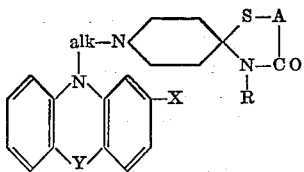

wherein X is H, Cl, CH$_3$—, CF$_3$—, CH$_3$O—, CH$_3$— or CH$_3$CO; Y is —S— or —CH$_2$CH$_2$—; alk is alkylene of 2 to 4 carbon atoms (e.g. ethylene, propylene, trimethylene or 2-methyltrimethylene); A is methylene, ethylene or ethylidene; and R is H or lower alkyl of at most 4 carbon atoms (e.g. methyl, ethyl, propyl or butyl) are useful as tranquilizers.

---

This application is a divisional application of Ser. No. 839,046, filed July 3, 1969, now U.S. Pat. No. 3,574,204, which in turn is a continuation-in-part application of Ser. No. 675,074, filed Oct. 13, 1967, now abandoned.

This invention relates to therapeutically useful piperidine spiro compounds of the formula:

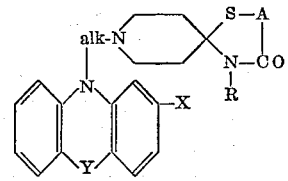

(I)

wherein X is H, Cl, CH$_3$—, CF$_3$—, CH$_3$O—, CH$_3$S— or CH$_3$CO—; Y is —S— or —CH$_2$CH$_2$—; alk is alkylene of 2 to 4 carbon atoms (e.g., ethylene, propylene, trimethylene or 2-methyltrimethylene); A is methylene, ethylene or ethylidene; and R is H or lower alkyl of at most 4 carbon atoms (e.g. methyl, ethyl, propyl and butyl).

For simplicity, the radical

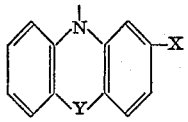

is expressed by —Z— in the following disclosure.

Compounds (I) can be prepared (i) by reacting a compound of the formula

Z—M wherein M is H or alkali metal (optimally Na) with a compound of the formula

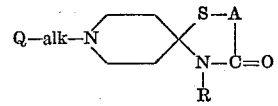

(II)

wherein Q is a reactive radical (optimally a halogen, e.g. Cl, Br or I, or reactive acid residue, e.g. —SO$_2$OH, acetoxycarbonyloxy, methylsulfonyloxy, p-tolylsulfonyloxy), (ii) by reacting a compound of the formula Z—alk—Q (Q being the same as above mentioned) with a compound of the formula

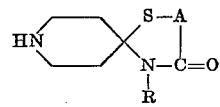

(III)

or (iii) by reacting a compound of the formula

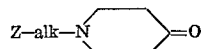

with a compound of the formula

HS—A—COOH and a compound of the formula

R—NH$_2$ or a salt thereof (e.g. ammonium carbonate).

These reactions are carried out in a solvent, and are facilitated at an elevated temperature of about 50° to about 200° C., especially at about the boiling point of the solvent. Most suitable solvents for reaction (i) are aromatic hydrocarbons such as xylene, for reaction (ii) alcohols such as ethanol, and for reaction (iii) solvents such as benzene which permit azeotropic removal of water formed. Any other suitable solvents such as methanol, propanol, isopropanol, butanol, acetone, methyl ethyl ketone, methyl butyl ketone, cyclohexanone, toluene, chlorobenzene, tetrahydrofuran, dioxane, diethyl ether, pyridine and liquid ammonia may also be used depending on the kinds of starting materials and reaction conditions. Acid acceptors such as alkali hydroxides, alkali carbonates and tertiary amines (e.g. pyridine, triethylamino) may be used for reactions (i) and (ii).

Piperidine spiro compounds (I) can form pharmaceutically acceptable acid addition salts with various inorganic and organic acids such as hydrochloric, hydrobromic, sulfuric, maleic, fumaric, tartaric acid and so on.

Starting materials (III) are new and can be prepared, for example, by reacting 4-oxopiperidine with a compound of the formula

R—NH$_2$ (R being as above defined) or a salt thereof (e.g. ammonium carbonate) and a compound of the formula

HS—A—COOH (A being as above defined). This procedure is described in J. Am. Chem. Soc. 76, 578–580 (1954) and J. Am. Chem. Soc. 80, 3469–3471 (1958). The reaction proceeds as follows:

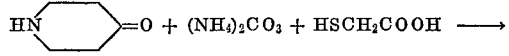

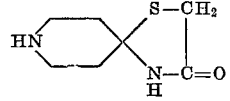

For example, 13.8 g. of 4-oxopiperidine hydrochloride is suspended in 15 ml. of ethanol, and 400 ml. of benzene, 14 g. of ammonium carbonate and 11 g. of thioglycolic acid are added thereto. The mixture is refluxed with stirring for 18 hours in a flask connected with a water-removing adapter. The reaction mixture is cooled and the solvent distilled off under reduced pressure to leave a reddish brown solid, which is suspended in 30 ml. of water. Then the suspension is saturated with sodium carbonate and extracted with chloroform. The chloroform layer is dried over anhydrous sodium sulfate and the solvent is distilled off under reduced pressure to leave a yellowish white solid, which is recrystallized from ethanol to give 5.5 g. of 3-oxo-1-thia-4,8-diazaspiro[4.5]decane as white needles melting at 235° to 236° C. If it is desired to prepare the compound (I) wherein R is lower alkyl of at most 4 carbon atoms, then the $(NH_4)_2CO_3$ in the foregoing reaction would be replaced by a compound of the formula

R—NH$_2$ wherein R is lower alkyl of at most 4 carbon atoms.

Starting materials (II) can be prepared, for example, by reacting the compound (III) with a bromochloroalkane of the formula Cl—alk—Br (alk being as above defined) or by reacting (III) with a haloalkanol of the formula HO—alk—halogen followed by esterifying, e.g. with p-toluenesulfonyl chloride. This procedure is described in Chem. Abstr. 62, 14638h Bull. Soc. Chim. France, 1968, 3246 and U.S. Pat. 3,359,265. The reaction proceeds as follows:

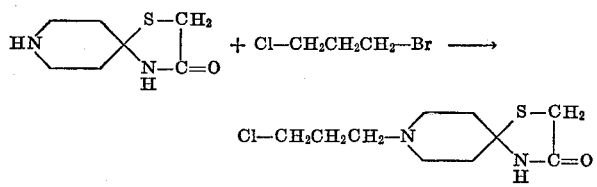

For example, a mixture of 8.6 g. of 3-oxo-1-thia-4,8-diazaspiro[4.5]decane, 9.5 g. of 1-bromo-3-chloropropane, 7 g. of potassium carbonate, 50 ml. of dimethylformamide and 50 ml. of ethanol is heated with stirring at 60° C. for 18 hours. After cooling, the insoluble matter is filtered off and the filtrate is concentrated under reduced pressure. Ethyl acetate is added to the residue and the solution is extracted with 5% hydrochloric acid. The aqueous layer is made alkaline with sodium hydrogen carbonate and is extracted with chloroform. The organic layer is washed with water, dried over anhydrous magnesium sulfate and concentrated under reduced pressure. The yellowish brown product thus obtained is recrystallized from isopropanol to give 5.1 g. of 8-(3-chloropropyl)-3-oxo-1-thia-4,8-diazaspiro[4.5]decane melting at 158° to 160° C. If it is desired to prepare the compound (I) wherein R is lower alkyl of at most 4 carbon atoms, then the H atom attached to the nitrogen atom adjacent to the carbonyl group in the foregoing reaction scheme would be replaced by an alkyl group of at most 4 carbon atoms.

The piperidine spiro compounds (I) of the invention are useful as tranquilizers. 8-[3-(2-chloro-10-phenothiazinyl)-propyl]-3-oxo-1-thia-4,8-diazaspiro[4.5]decane hydrochloride (Compound A), 3-oxo-8-[3-(2-trifluoromethyl-10-phenothiazinyl)-propyl]-1-thia-4,8-diazaspiro[4.5]decane hydrochloride (Compound B), 8-[3-(2-acetyl-10-phenothiazinyl)propyl]-3-oxo-1-thia-4,8-diazaspiro[4.5]decane (Compound C) and 4-oxo-9-[3-(2-trifluoromethyl-10-phenothiazinyl)propyl]-1-thia-5,9-diazaspiro[5.5]undecane (Compound D), for example, have the following pharmacological properties (given in terms of median effective dose (ED$_{50}$) in mg./kg. and median lethal dose (LD$_{50}$) in mg./kg.):

| | Compound | | | |
|---|---|---|---|---|
| | A | B | C | D |
| Suppression of spontaneous motility (mouse) | 6.3 | 6.3 | 6.3 | 2.5 |
| Suppression of conditioned reflex (rat) | 9.6 | 3.2 | 4 | 4 |
| Suppression of fighting activity (mouse) | 16.8 | 13 | 30 | 5.2 |
| Ataxia (mouse) | 17 | | | |
| Apomorphine antagonistic activity (rat) | 20 | 12 | 60 | 5–10 |
| Catalepsy (rat) | 10 | 40 | 80–160 | 10–20 |
| Norepinephrine antagonistic activity (rat) | 2.7 | 1.25 | 0.31 | 1.25 |
| LD$_{50}$ (mouse) | >1,020 | >640 | >640 | >640 |

The piperidine spiro compounds (I) as well as the pharmaceutically acceptable acid addition salts thereof can be administered safely, in the form of tablets, as tranquilizers e.g. for schizophrenia or mania, the usual dose for adults being 50 to 300 mg., i.e. 2 to 12 tablets, each tablet containing 25 mg. of the compound (I), per person per day. The tablets each may comprise e.g.:

| | Mg. |
|---|---|
| Compound (I) | 25 |
| Lactose | 54 |
| Starch | 15 |
| Sodium salt of carboxymethylcellulose | 2 |
| Talc | 26 |
| Magnesium stearate | 1 |
| Refined sucrose | 73.5 |
| Acacia | 2.2 |
| Calcium carbonate | 11.2 |
| Beeswax | 0.1 |
| Total | 210 |

The tablets may be sugar-coated.

In the following illustrative examples of typical and presently preferred embodiments of the invention, "g." stands for "gram(s)."

EXAMPLE 1

10 g. of phenothiazine is allowed to react in liquid ammonia with sodium amide prepared from 1.4 g. of sodium. Then the ammonia is replaced by xylene. To the xylene solution is added dropwise a solution of 15 g. of 8-(3-chloropropyl)-3-oxo-1-thia-4,8-diazaspiro[4.5]decane in 120 ml of xylene, taking about an hour, while heating at 130° to 140° C. Then heating (130° to 140° C.) is continued for a further one hour. The mixture is cooled, washed with water and dried over sodium sulfate. The xylene is distilled off to leave an oily residue, which is then dissolved in ether. Dry hydrogen chloride gas is introduced into the ether solution to precipitate 12 g. of 3-oxo-8-[3-(10-phenothiazinyl)propyl]-1-thia-4,8-diazaspiro[4.5]decane hydrochloride melting at 197° to 198° C. (decomposition).

EXAMPLE 2

3.1 g. of 2-chloro-10-(3-chloropropyl)phenothiazine and 2.1 g. of 3-oxo-1-thia-4,8-diazaspiro[4.5]decane are dissolved in 100 ml. of ethanol, and 3 g. of potassium carbonate is added to the solution. The mixture is refluxed for 48 hours. Then the solvent is distilled off. To the residue is added 100 ml. of water. The oil separated is extracted with benzene. The extract is dried over sodium sulfate and the solvent is distilled off under reduced pressure to give a reddish brown oily residue which is purified by column chromatography with 60 g. of activated alumina. First, the unreacted 2-chloro-10-(3-chloropropyl)phenothiazine is eluted with benzene. Then the objective product is eluted with ethyl acetate. The eluate is concentrated, and the obtained white crystals are recrystallized from acetone to give 2.4 g. of 8-[3-(2-chloro-10-phenothiazinyl)propyl] - 3-oxo-1-thia-4,8-diazaspiro[4.5]decane as white needles, melting at 154° to 156° C. Its hydrochloride, white needles recrystallized from methanol, melts at 262° to 264° C. (decomposition).

EXAMPLE 3

A mixture of 11.2 g. of 1-[3-(2-chloro-10-phenothiazinyl)propyl]-4-oxopiperidine, 3 g. of thioglycolic acid, 1.8 g. of ammonium carbonate and 300 ml. of benzene is refluxed with stirring for 15 hours in a flask connected with a water-removing adapter. As an azeotropic mixture with benzene, 1.3 ml. of water formed by the reaction is separated. The reaction mixture is cooled, washed with 5% aqueous ammonia and water, and dried over sodium sulfate. The benzene is distilled off under reduced pressure to leave a reddish brown residue which is crystallized from acetone to give 6.5 g. of 8-[3-(2-chloro-10-phenothiazinyl)propyl] - 3 - oxo-1-thia-4,8-diazaspiro[4.5]decane as white needles melting at 154° to 156° C.

EXAMPLE 4

30 g. of 1-[3-(10-phenothiazinyl)-propyl]-4-oxopiperidine, 13 g. of 2-mercaptopropionic acid and 8 g. of ammonium carbonate are heated in 400 ml. of boiling benzene, and the reaction mixture is treated as in Example 3 to produce 3-methyl-8-[3-(10-phenothiazinyl)propyl]-3-oxo-1-thia-4,8-diazaspiro[4.5]decane (16 g.) as white needles melting at 185° to 186° C.

EXAMPLE 5

20.3 g. of 1-[3-(2-trifluoromethyl-10-phenothiazinyl)propyl]-4-oxopiperidine, 6 g. of 3-mercaptopropionic acid and 5.5 g. of ammonium carbonate are heated in 400 ml. of boiling benzene for 18 hours under reflux, 2 ml. of water being separated as an azeotropic mixture with benzene. The reaction mixture is treated as in Example 3 to give a reddish brown residue, which is purified by column chromatography with 130 g. of activated alumina. The unreacted starting oxopiperidine is first eluted with toluene, and then the objective product is eluted with ethyl acetate. White crystals obtained by concentrating the eluate are recrystallized from isopropanol to give 4.8 g. of 4-oxo-9-[3-(2-trifluoromethyl-10-phenothiazinyl)propyl]-1-thia-5,9-diazaspiro[5.5]undecane, melting at 177° to 179° C.

EXAMPLE 6

20 g. of 1-[3-(10-phenothiazinyl)propyl]-4-oxopiperidine, 6.5 g. of thioglycolic acid and 5.2 g. of propylamine are heated in 400 ml. of boiling benzene and the reaction mixture is treated as in Example 3 to give a reddish brown residue, which is purified by column chromatography as in Example 5. The reddish brown oily product obtained by concentrating the ethyl acetate eluate is converted to the crystalline oxalate, and the crystals are recrystallized from isopropanol to give 4.1 g. of 3-oxo-8-[3-(10-phenothiazinyl)propyl] - 4-propyl-1-thia-4,8-diazaspiro[4.5]decane oxalate, $C_{25}H_{31}N_3S_2O \cdot \frac{1}{2}(C_2H_2O_4)$, melting at 208° to 209° C. (decomposition).

EXAMPLES 7–26

In the same manner as in Examples 1 to 6, the following piperidine spiro compounds (I) are produced:

(7) 3-oxo-8-[2-(10-phenothiazinyl)ethyl]-1-thia-4,8-diazaspiro[4.5]decane oxalate, melting at 91° to 93° C. (decomposition);
(8) 8-[2-(2-chloro-10-phenothiazinyl)ethyl]-3-oxo-1-thia-4,8-diazaspiro[4.5]decane hydrochloride, melting at 262° to 264° C.;
(9) 8-[3-(2-methyl-10-phenothiazinyl)propyl]-3-oxo-1-thia-4,8-diazaspiro[4.5]decane hydrochloride, melting at 220° to 222° C. (decomposition);
(10) 3-oxo-8-[3-(2-trifluoromethyl-10-phenothiazinyl)propyl]-1-thia-4,8-diazaspiro[4.5]decane hydrochloride, melting at 260° to 262° C. (decomposition);
(11) 8-[3-(2-methoxy-10-phenothiazinyl)propyl]-3-oxo-1-thia-4,8-diazaspiro[4.5]decane hydrochloride, melting at 184° to 187° C.;
(12) 8-[3-(2-methylthio-10-phenothiazinyl)propyl]-3-oxo-1-thia-4,8-diazaspiro[4.5]decane hydrochloride, melting at 220° to 223° C. (decomposition);
(13) 8-[3-(2-acetyl-10-phenothiazinyl)propyl]-3-oxo-1-thia-4,8-diazaspiro[4.5]decane, melting at 150° to 152° C.;
(14) 8-[1-methyl-2-(10-phenothiazinyl)ethyl]-3-oxo-1-thia-4,8-diazaspiro[4.5]decane hydrochloride, melting at 225° to 227° C. (decomposition);
(15) 8-[3-(2-methoxy-10-phenothiazinyl)-2-methylpropyl]-3-oxo-thia-4,8-diazaspiro[4.5]decane, melting at 192° to 194° C;
(16) 4-oxo-9-[3-(10-phenothiazinyl)propyl]-1-thia-5,9-diazaspiro[5.5]undecane, melting at 195° to 196° C;
(17) 9-[3-(2-chloro-10-phenothiazinyl)propyl]-4-oxo-1-thia-5,9-diazaspiro[5.5]undecane, melting at 216° to 217° C;
(18) 8-[3-(2-chloro-10-phenothiazinyl)propyl]-2-methyl-3-oxo-1-thia-4,8-diazaspiro[4.5]decane hydrochloride, melting at 168° to 169° C.;
(19) 8-[3-(2-trifluoromethyl-10-phenothiazinyl)propyl]-2-methyl-3-oxo-1-thia-4,8-diazaspiro[4.5]decane hydrochloride, melting at 182° to 184° C.;
(20) 8-[3-(2-chloro-10-phenothiazinyl)propyl]-4-methyl-3-oxo-1-thia-4,8-diazaspiro[4.5]decane hydrochloride, melting at 200° to 202° C. (decomposition);
(21) 8-[3-(2-chloro-10-phenothiazinyl)propyl]-4-ethyl-3-oxo-1-thia-4,8-diazaspiro[4.5]decane oxalate, melting at 188° to 190° C. (decomposition);
(22) 4-butyl-8-[3-(2-chloro-10-phenothiazinyl)propyl]-3-oxo-1-thia-4,8-diazaspiro[4.5]decane oxalate, melting at 144 to 146° C. (decomposition);
(23) 8-[3-(10,11-dihydro-5H-dibenz[b,f]azepin-5-yl)propyl]-3-oxo-1-thia-4,8-diazaspiro[4.5]decane hydrochloride, melting at 241° to 243° C. (decomposition);
(24) 8-[3-(10,11-dihydro-5H-dibenz[b,f]azepin-5-yl)propyl]-2-methyl-3-oxo-1-thia-4,8-diazaspiro[4.5]decane hydrochloride, melting at 273° to 275° C. (decomposition).
(25) 9-[3-(10,11-dihydro-5H-dibenz[b,f]azepin-5-yl)propyl]-4-oxo-1-thia-5,9-diazaspiro[5.5]undecane hydrochloride, melting at 249° to 252° C. (decomposition); and
(26) 8-[3-(10,11-dihydro-5H-dibenz[b,f]azepin-5-yl)propyl]-4-methyl-3-oxo-1-thia-4,8-diazaspiro[4.5]decane hydrochloride, melting at 236° to 239° C. (decomposition).

Any of the foregoing compounds as exemplified in the examples wherein the hydrochloride or oxalate salt is prepared may also be utilized in the form of the corresponding free base. For example, the compound of Example 25 may be converted to and utilized as 9-[3-(10,11 - dihydro - 5H - dibenz[b,f]azepin-5-yl)propyl]-4-oxo-1-thia-5,9-diazaspiro[5.5]undecane, and the compound of Example 26 may be converted to and utilized as 8 - [3 - (10,11 - dihydro - 5H - dibenz[b,f]azepin-5-yl)propyl] - 4 - methyl - 3 - oxo-1-thia-4,8-diazaspiro[4.5]decane.

What is claimed is:

1. A compound of the formula

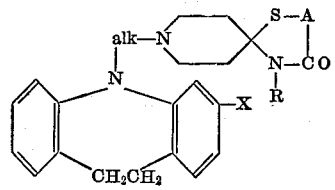

wherein X is H, Cl, $CH_3$—, $CF_3$—, $CH_3O$—, $CH_3S$— or $CH_3CO$—, alk is alkylene of 2 to 4 carbon atoms, A is methylene, ethylene or ethylidene and R is H or lower alkyl or at most 4 carbon atoms.

2. A pharmaceutically acceptable salt of a compound according to claim 1.

3. A compound according to claim 1, namely, 8-[3-(10,11 - dihydro - 5H - dibenz[b,f]azepin-5-yl)propyl]-3-oxo-1-thia-4,8-diazaspiro[4.5]decane.

4. A compound according to claim 1, namely, 8-[3-(10,11 - dihydro - 5H - dibenz[b,f]azepin-5-yl)propyl]-2-methyl-3-oxo-1-thia-4,8-diazaspiro[4.5]decane.

5. A compound according the claim 1, namely, 9-[3-(10,11 - dihydro - 5H - dibenz[b,f]azepin-5-yl)propyl]-4-oxo-1-thia-5,9-diazaspiro[5.5]undecane.

6. A compound according to claim 1, namely, 8-[3-(10,11 - dihydro - 5H - dibenz[b,f]azepin-5-yl)propyl]-4-methyl-3-oxo-1-thia-4,8-diazaspiro[4.5]decane.

7. A compound according to claim 2, namely, 9-[3-(10,11 - dihydro - 5H - dibenz[b,f]azepin-5-yl)propyl]-4-oxo-1-thia-5,9-diazaspiro[5.5]undecane hydrochloride.

8. A compound according to claim 2, namely, 8-[3-(10,11 - dihydro - 5H - dibenz[b,f]azepin-5-yl)propyl]-4 - methyl-3-oxo-1-thia-4,8-diazaspiro[4.5]decane hydrochloride.

References Cited

UNITED STATES PATENTS 3,574,204  4/1971  Nakanishi et al. ----- 260—243

JOHN M. FORD, Primary Examiner

U.S. Cl. X.R.

260—293.4; 424—246, 267